C. WALERIUS.
AUTOMATIC COUPLING FOR AIR PIPES.
APPLICATION FILED MAY 26, 1911.
1,037,089.
Patented Aug. 27, 1912.
3 SHEETS—SHEET 1.
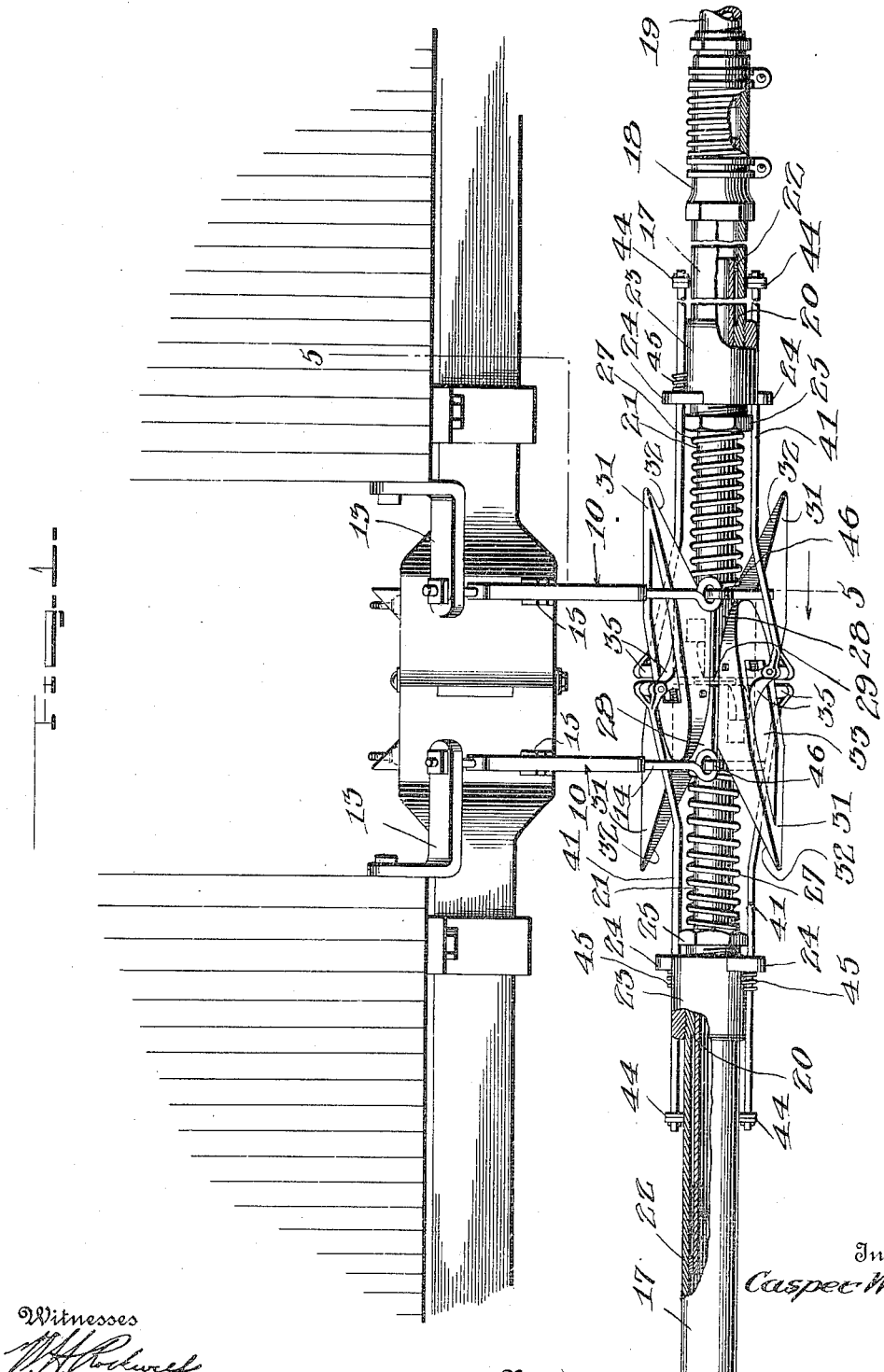
Witnesses
W. H. Rockwell
Francis Boyle
Inventor
Casper Walerius
By
Chandler & Chandler
Attorneys C. WALERIUS.
AUTOMATIC COUPLING FOR AIR PIPES.
APPLICATION FILED MAY 26, 1911.
1,037,089.
Patented Aug. 27, 1912.
3 SHEETS—SHEET 2.
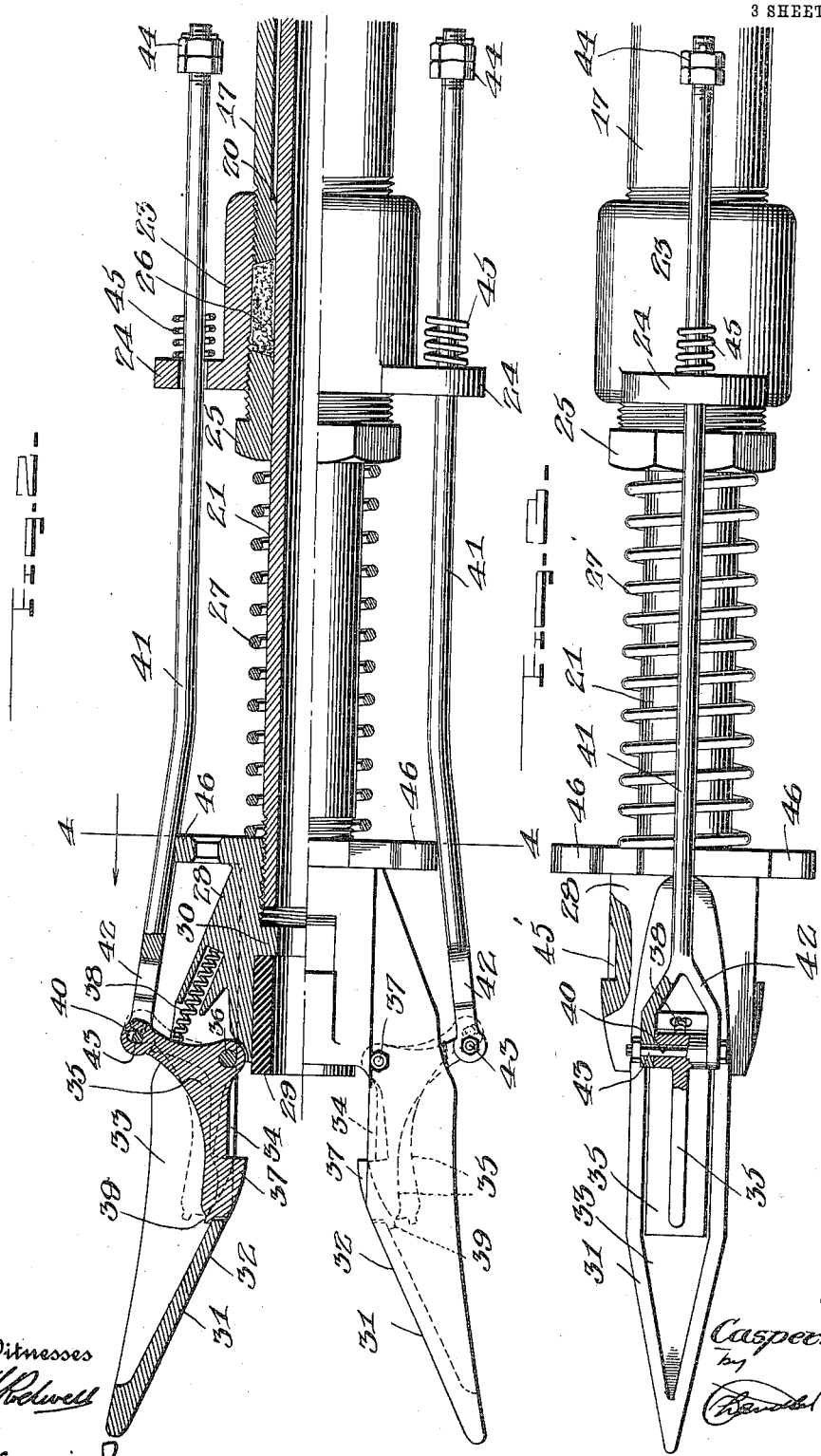

C. WALERIUS.
AUTOMATIC COUPLING FOR AIR PIPES.
APPLICATION FILED MAY 26, 1911.
1,037,089.
Patented Aug. 27, 1912.
3 SHEETS—SHEET 3.
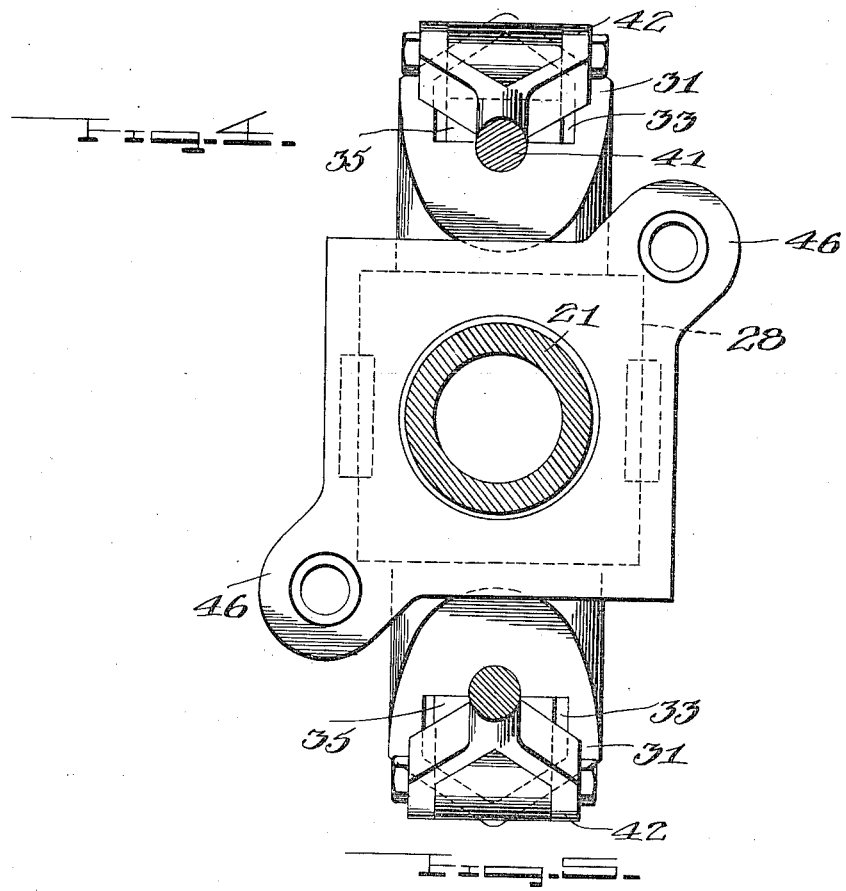
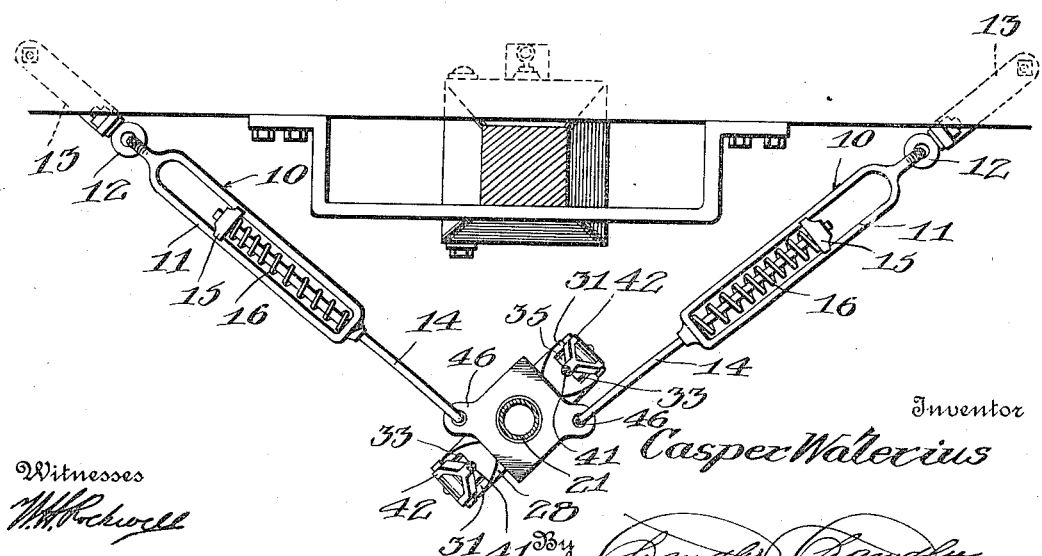
Witnesses
W. H. Packwell
Francis Boyle
Inventor
Casper Walerius
By Randall Chandler
Attorneys

UNITED STATES PATENT OFFICE.

CASPER WALERIUS, OF ST. PAUL, MINNESOTA.

AUTOMATIC COUPLING FOR AIR-PIPES.

1,037,089. Specification of Letters Patent. Patented Aug. 27, 1912.

Application filed May 26, 1911. Serial No. 629,633.

*To all whom it may concern:*

Be it known that I, CASPER WALERIUS, a citizen of the United States, residing at St. Paul, in the county of Ramsey, State of Minnesota, have invented certain new and useful Improvements in Automatic Couplers for Air-Pipes; and I do hereby declare the following to be a full, clear, and exact description of the invention, such as will enable others skilled in the art to which it appertains to make and use the same.

This invention relates to automatic couplers for train pipes, and has for an object to provide mating train pipe coupling elements that will automatically couple upon coupling of the cars together, and will remain engaged until after the draw heads of the coupled cars are uncoupled and the cars move apart.

A further object of the invention is to provide a coupling element having a novel latch that will automatically lock with a similar latch on the mating coupling element regardless of whether the couplings are in alinement or not, and further will be so constructed as to yield during twisting of the coupling elements during the act of coupling and during the various angular relative positions assumed by coupled cars in moving upon grades, rounding turns and the like.

With the above objects in view the invention consists in certain novel details of construction and combination of parts hereinafter fully described and claimed, it being understood that various modifications may be made in the minor details of construction within the scope of the appended claims.

In the accompanying drawings forming part of this specification:—Figure 1 is a side elevation showing mating coupling elements embodying my improvements in coupled position and shown in position beneath coupled draw heads of ordinary type. Fig. 2 is a side elevation of one of my improved coupling elements shown partly in section. Fig. 3 is a plan view of the coupling element with portions broken away. Fig. 4 is a cross sectional view taken on the line 4—4 Fig. 2. Fig. 5 is a cross sectional view taken on the line 5—5 Fig. 1 showing the manner of attaching the coupling element to a car.

Two mating coupling elements are constructed identically alike, and as a description of one applies equally well to the other, I will describe the construction of one, and refer to the similar parts of the other by similar characters of reference.

The coupling element is suspended beneath the draw head by means of hangers 10 each preferably consisting of a closed loop 11 having an interlocking ring connection 12 at one end with an angle iron bracket 13 fixed to the car to one side of the draw head, and having a suitable orifice at the opposite end in which is slidingly fitted a pin 14 having at one end an interlocking ring connection with the coupling element as will hereinafter be more fully described, and having at its opposite end a guide 15 which engages the sides of the closed loop 11, and a helical spring 16 is seated on this pin between the guide and orificed end of the loop and yieldingly holds the pin at a predetermined position which permits of the pin yielding within the loop during the advance of the car over grades and rounding turns and also during coupling together of the mating coupling elements comprising the subject-matter of this invention.

The coupling element comprises a pipe 17 one end of which is threaded into a metallic nipple 18 of the usual flexible train pipe end 19. The pipe is internally provided with an annular rib 20 and slidingly fitting this rib and telescoping into the pipe is a second pipe 21 which is provided at its inner end with a peripheral annular stop shoulder 22, this stop shoulder being designed to engage with the rib 20 and limit extending movement of both pipes.

The pipe 21 has a stuffing box connection with the pipe 17, this connection including a sleeve 23 which is threaded upon the pipe 17 and is provided with oppositely disposed orificed lugs 24, the purpose of which will presently be explained. A nipple nut 25 is threaded into the sleeve, and the usual packing element 26 is arranged between the nipple nut and confronting end of the pipe 17. The pipes 17 and 21 by virtue of this stuffing box connection are capable of extending and telescoping movement without escape of air.

Surrounding the pipe 21 is a helical spring 27 which bears against the nipple nut and against a novel locking head about to be described, and resists telescoping movement of the pipes 17 and 21, while at the same time being under sufficient tension to hold the locking heads of both mating coupling elements rigidly locked together so that loss of air through the locking heads is prevented.

The locking head comprises a hollow block 28 into one end of the bore of which is threaded the end of the pipe 21, a tubular rubber or similar cushion 29 being snugly fitted on the opposite end of the bore, for contacting with a similar cushion in the mating coupling element, and an annular abutment 30 is arranged in the bore of the block to form a seat for the cushion. Two forwardly extending horns 31 project from opposite sides of the block, and have their confronting inner edges 32 inclining in the direction of the block to form cam faces which impinge against similar cam faces on the mating coupling element horns and direct the latter into interlocked position as shown in Fig. 1.

Each horn is provided in its outer face with a longitudinal slot 33 which opens through the inner face of the horn in a contracted oblong opening 34. A bell crank lever latch 35 is pivoted at its elbow to the walls of this opening as shown at 36 and has one leg equipped with a tooth 37 which projects into the space between the horns and interlocks with a notch on the mating coupling element when the latch is in operative position. The latch being normally held in operative position by a helical spring 38 which is seated in a suitable groove formed in the outer face of the head and bears against the other leg of the latch. An extension 39 is formed on the leading end of the toothed leg and bears against the floor of the slot 33 to limit the extent to which the tooth 37 projects into the opening between the horns.

The spring pressed leg of each latch projects beyond the outer face of the related horn and is formed with a transverse oval opening 40. A rod 41 is loosely engaged through the above mentioned orificed lug 24, and is equipped at its forward end with a fork 42, the branches of which engage opposite sides of the projecting latch leg, and a cylindrical pivot pin 43 is passed through these branches and oval opening of the leg. By virtue of the oval opening, the pivot pin may rock in the opening so that during twisting movement of the rod 41 when the mating coupling elements contact, should they be out of alinement, the latch will be in no way racked or injured. The free end of each rod is equipped with a lock nut 44 or similar stop collar, and seated on the rod between the lock nut and orificed lug 24 is a helical buffer spring 45 which forms a yielding cushion between the lock nut and related orificed lug during extending movement of the pipes 17 and 21 when the draw heads are uncoupled and the trains begin to move apart.

Formed in opposite sides of the hollow block 28 are notches 45' within which the toothed legs of bell crank levers on the mating coupling seat, the said mating coupling being likewise formed with similar notches within which the toothed legs of the bell crank levers on the coupling above described seat.

During extending movement of the pipes 17 and 21, or better, when the pipe 17 is drawn outwardly from the pipe 21 as the cars begin to move apart, both of the rods 41 will be pulled rearwardly by the indirect contact of the lock nuts 44 with the lugs 24, and during this movement of the rods, the bell crank lever latches will be rocked on their pivots, and the toothed legs of the levers withdrawn into their respective horns so that uncoupling of the mating coupling elements is effected.

For attaching the coupling element to the above described hangers 10, the block 28 is provided at its rear end with oppositely disposed orificed lugs 46, through which lugs are engaged the terminal rings or eyes of the hanger rods 14. During twisting movement of the block when the mating coupling elements are interlocking, by virtue of the loose connection of the spring controlled hanger rods with the block, both coupling elements may yield relatively to each other so that coupling is effected without racking of the elements, and further when the coupling elements are locked rigidly together, they may simultaneously yield as the coupled cars are advancing over grades and rounding turns, without danger of accidental uncoupling.

What is claimed, is:—

1. In a train pipe coupling, an extensible pipe carried by the train pipe, orificed lugs carried by one of the pipe sections, a hollow block carried by the other pipe section having oppositely disposed forwardly extending hollow horns, spring controlled bell crank latches pivoted at their elbows in said horns and each having a toothed leg normally extending into the space between said horns, said block being provided on opposite sides with locking notches adapted to receive the toothed legs of bell crank levers carried by a mating coupling; a rod connected to the free leg of each bell crank latch and extending through said orificed lugs, collars on the free ends of said rods operatively contacting with said lugs during extending movement of said pipes and operating to rock said bell crank latches on their pivots and withdraw said toothed legs into said hollow horns.

2. A train pipe coupling including an extensible pipe carried by the train pipe, orificed lugs carried on the external pipe section, a hollow head carried on the internal pipe section, a helical spring seated on said internal pipe serving to limit telescoping movement of the pipes, said head having spaced forwardly extending hollow horns, spring controlled bell crank latches pivoted at their elbows on said horns and each having a tooth on one leg normally projecting into the space between said horns, said head being formed on opposite sides with locking notches, rods loosely connected to the bell crank latches and loosely engaged in said orificed lugs, and collars on the outer ends of said rods operatively engagable with said orificed lugs upon a predetermined extending movement of said pipes and operating to rock said bell crank latches on their pivots and withdraw the toothed legs of said bell crank latches out of the space between said horns.

3. In a train pipe coupling, an extensible pipe connected to the train pipe, orificed lugs carried on the external pipe section, a hollow head carried at the outer end of the internal pipe section, a helical spring seated on said internal pipe section between said head and said external pipe section and serving to hold said pipe sections normally extended, said head being equipped with forwardly projecting hollow horns, spring controlled bell crank latches pivoted at their elbows in said hollow horns, each latch having one leg equipped with a tooth which normally projects into the space between said horns, and having its opposite leg extending beyond the outer face of said horn and formed with a slot, said head being formed on opposite sides with locking notches, rods slidingly fitted in said orificed lugs and having pivot pins at their forward ends loosely fitting in said slots, collars at the free ends of said rods operatively engagable with said orificed lugs during extending movement of said pipe sections and operating to rock said bell crank latches on their pivots to withdraw said teeth into said hollow horns.

In testimony whereof, I affix my signature, in presence of two witnesses.

CASPER WALERIUS.

Witnesses:
A. F. MASCHGER,
JOHN SAAM.